RICHARD C. ROPP
HARRY D. LAYMAN
INVENTORS

United States Patent Office 3,318,818
Patented May 9, 1967

3,318,818
COPPER ACTIVATED STRONTIUM METAPHOSPHATE PHOSPHORS
Richard C. Ropp, North Caldwell, N.J., and Harry D. Layman, Ulster, Pa., assignors to Sylvania Electric Products Inc., a corporation of Delaware
Filed Nov. 14, 1963, Ser. No. 323,822
6 Claims. (Cl. 252—301.4)

This invention relates to novel phosphor compositions which are useful in X-ray and cathode ray tubes, low pressure mercury discharge devices, commonly called fluorescent lamps, and particularly in high pressure mercury discharge devices, commonly called mercury lamps. Particularly this invention concerns strontium phosphate phosphors activated by copper and desirably, cupric copper.

Fluorescent phosphors are well known to the art and have previously been used with many types of mercury discharge devices. For example, they have been coated upon the inner surface of fluorescent lamp envelopes where they are excited by energy at 2537 A., an energy line of the low pressure mercury discharge. They have also been used in mercury lamps where they are excited by energy at 2640, 2804, 2967, 3022, 3126 and 3650 A., the principal ultraviolet lines of the high pressure discharge.

In general, phosphors are sensitive to temperature conditions and when heated, their emission decreases. Various phosphors are very sensitive while others have lesser sensitivity. The latter phosphors have particular applicability in mercury lamps because the envelopes of such lamps are raised to rather high temperatures when compared to fluorescent lamps; usually about 200 to 400° C. Furthermore, the discharge of the high pressure mercury arc is particularly deficient in red; the visible radiation of the arc being energy at wavelengths of 4048, 4358, 5461, 5770 and 5790 A. Almost all of the visible radiation is contained in the blue region together with a line in the green and a line in the yellow. Thus when a mercury lamp illuminates a red object, particularly one reflecting light only in the range of 6000 to 6800 A., the object appears black. The phosphors should compensate for this deficiency.

Hence three of the major considerations for mercury lamp phosphors are that they should be excited by the energy of the high pressure mercury discharge, they should emit even at elevated temperatures and their emission should contain a good deal of red.

We have discovered certain phosphors which attain these criteria. Strontium metaphosphate activated by copper and desirably cupric copper are found to be an excellent high pressure mercury lamp phosphor. In particular, the $\beta$ and $\alpha$ forms of these phosphors, the trimetaphosphate and the tripolyphosphate respectively, are found to be successfully excited by the radiation from high pressure mercury lamps. Furthermore these phosphors have an excellent deep red emission and are fairly insensitive to increases in temperature. Mixtures of these forms are also useful for such applications.

Accordingly, the primary object of our invention is the production of a red-emitting phosphor, relatively insensitive to heat differentials and responsive to radiation emitted from a high pressure mercury discharge.

A feature of our invention is the activation of strontium metaphosphate by copper.

Another feature of our invention is activation of strontium metaphosphates by cupric copper.

And yet another feature of our invention is activation with copper of a strontium trimeta- and/or tripolyphosphate, that is the $\beta$ and $\alpha$ forms respectively; these forms being $Sr_3(P_3O_9)_2$:Cu and $Sr_5(P_3O_{10})_2$:Cu.

The many other objects, features and advantages of the instant invention will become manifest to those conversant with the art upon reading the following specification when taken in conjunction with the accompanying drawings wherein preferred embodiments of our invention are shown and described by way of illustrative examples.

Figure 1:
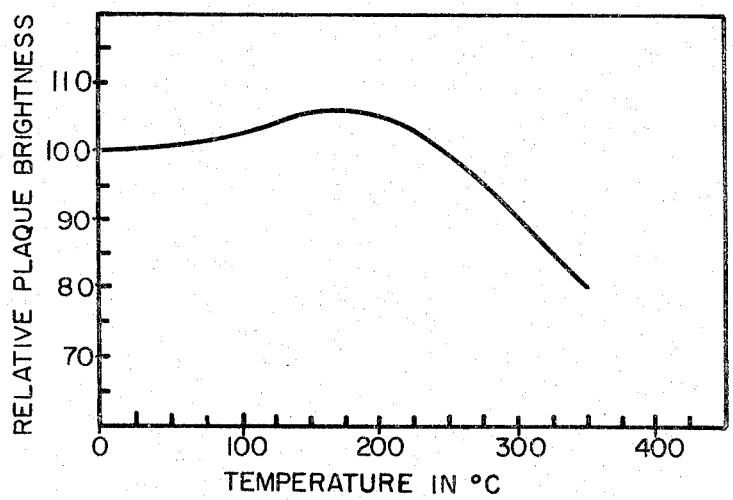
FIGURE 1 is a curve illustrating the effect of modification of the temperature upon the emission of the phosphor.
Figure 2:
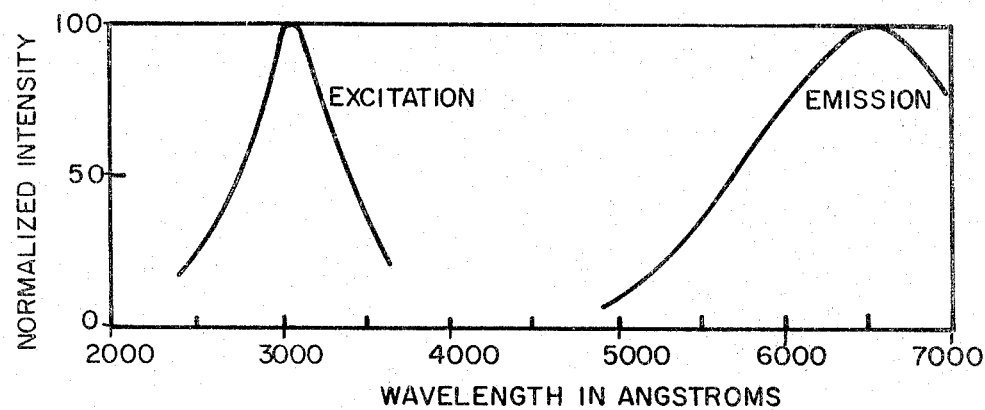
FIGURE 2 is a graph illustrating the excitation and emission spectra of a strontium trimetaphosphate activated by cupric copper.

We have found that if a copper compound in a cuprous state, such as couprous chloride, is mixed in proper proportion with the monobasic phosphate of strontium, and subsequently fired in air, a superior phosphor results having properties desirable for application in high pressure mercury vapor lamps. Notably, firing in a reducing atmosphere destroys luminescence. As shown in FIGURE 1 the emission spectrum has considerable deep red emission, a property desirable for color correction in mercury lamps as shown in FIGURE 2. Furthermore, the phosphor is efficiently excited by 3000 A. ultraviolet light, a wavelength of high intensity generated in the mercury lamp. A second requisite property for mercury lamps is good temperature dependence of luminescence. The data in FIG. 1 show that this phosphor is quite suited for use in mercury lamps at elevated temperatures.

We have found that the phosphor is best prepared using $Sr(H_2PO_4)_2$ as a starting material, although it is possible to use $SrCO_3$ or compounds which form the oxide to combine with ammonium phosphate to form the strontium metaphosphate.

The two forms of the phosphor which are of primary applicability, as we have indicated, are the trimetaphosphate and the tripolyphosphate. The trimetaphosphate (the $\beta$ form), $Sr_3(P_3O_9)_2$ is a ring structure while the polymeta (the $\alpha$ form) $Sr_5(P_3O_{10})_2$ is a linear chain configuration. The X-ray diffraction pattern including the principal $d$ lines and intensities of these phosphors are set forth in Table I, following:

TABLE I

| Strontium trimetaphosphate Activated By Copper $Sr_3(P_3O_9)_2$:Cu | | Strontium tripolyphosphate Activated By Copper $Sr_5(P_3O_{10})_2$:Cu | |
|---|---|---|---|
| d Line | Intensity | d Line | Intensity |
| 6.81 | 5 | 7.06 | 62 |
| 5.76 | 7 | 5.85 | 20 |
| 3.67 | 100 | 4.67 | 15 |
| 3.47 | 8 | 4.43 | 100 |
| 3.19 | 5 | 3.87 | 75 |
| 2.86 | 15 | 3.81 | 85 |
| 2.59 | 27 | 3.61 | 43 |
| 2.37 | 11 | 3.35 | 25 |
| 2.08 | 20 | 3.18 | 30 |
| | | 2.92 | 33 |
| | | 2.58 | 35 |

The copper activator content of the phosphor can be varied between about 0.001 to 0.1 mole per 2 moles $PO_3$ with the optimum copper content being at 0.0025 mole per two moles of $PO_3$.

As is seen in FIGURE 1, the emission of our phosphor rises to a peak at about 200° C., a point which is approximately the same as the surface temperature of the phosphor coating on high pressure mercury lamp envelopes. After this peak, the brightness decreases but only to a figure of 80% of the original brightness at 250° C.

In the preparation of our phosphor, we prefer the use of $Sr(H_2PO_4)_2$ as a starting material although a strontium salt combined with an ammonium phosphate to form the strontium metaphosphate can be employed. Copper can be added as any cuprous salt, although we prefer to use $Cu_2Cl_2$. The correct proportions of raw materials may be mixed by ball-milling, hammer-milling or other suitable means. The prepared mixture is fired between 1000° F. and 1900° F., but not limited to that range, to form the metaphosphate, containing the luminescent copper.

The following examples illustrate the invention:

*Example I*

Mix together 559.2 gm. $Sr(H_2PO_4)_2$, 1.0 gm. $Cu_2Cl_2$ and 1.32 gm. $(NH_4)_2HPO_4$ thoroughly. Place the mixture in a 500 ml. covered silica crucible and fire for 2 hours at 1600° F. in air. The red emitting strontium tripolyphosphate phosphor is obtained and can be excited by high pressure mercury lamp radiation.

*Example II*

Blend thoroughly 559.2 gm. $Sr(H_2PO_4)_2$, 10.0 gm. $Cu_2Cl_2$, and 6.6 gm. $(NH_4)_2HPO_4$. Fire in a covered 500-ml. silica crucible for 2 hours at 1550° F. A deep red emitting strontium trimetaphosphate phosphor is obtained.

*Example III*

Mix together thoroughly 279.6 gm. $Sr(H_2PO_4)_2$, 0.50 gm. $Cu_2Cl_2$, 0.33 gm. $(NH_4)_2HPO_4$, and 88.6 gm. $SrCO_3$. Fire in a covered 500-ml. crucible for 2 hours at 1650° F. A red emitting strontium tripolyphosphate phosphor is obtained.

It is apparent that modifications and changes can be made within the spirit and scope of the instant invention. It is our intention, however, only to be limited by the scope of the appended claims.

As our invention we claim:

1. A red emitting strontium metaphosphate phosphor activated to luminescence by 0.001 to 0.1 mole of copper per two moles of metaphosphate.
2. The phosphor according to claim 1 wherein the copper is in the cupric valence state.
3. A red emitting α strontium metaphosphate phosphor activated to luminescence by 0.001 to 0.1 mole of copper per two moles of metaphosphate.
4. The phosphor according to claim 3 wherein the copper is in the cupric valence state.
5. A red emitting β strontium metaphosphate phosphor activated to luminescence by 0.001 to 0.1 mole of copper per two moles of metaphosphate.
6. The phosphor according to claim 5 wherein the copper is in the cupric valence state.

References Cited by the Examiner

UNITED STATES PATENTS 2,270,124   1/1942   Huniger et al. _____ 252—301.4

OTHER REFERENCES

Kroger: Some Aspects of the Luminescence of Solids, Elsevier Pub. Co. Inc., New York, 1948.

TOBIAS E. LEVOW, *Primary Examiner.*

R. D. EDMONDS, *Assistant Examiner.*